United States Patent
Xu et al.

(10) Patent No.: US 10,338,293 B2
(45) Date of Patent: Jul. 2, 2019

(54) BACKLIGHT SOURCE AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Shanfei Xu, Beijing (CN); Boran Zheng, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 761 days.

(21) Appl. No.: 14/908,498

(22) PCT Filed: Aug. 6, 2015

(86) PCT No.: PCT/CN2015/086254
§ 371 (c)(1),
(2) Date: Feb. 9, 2016

(87) PCT Pub. No.: WO2016/150067
PCT Pub. Date: Sep. 29, 2016

(65) Prior Publication Data
US 2016/0282535 A1 Sep. 29, 2016

(30) Foreign Application Priority Data
Mar. 26, 2015 (CN) .................... 2015 2 0175601 U

(51) Int. Cl.
*F21V 8/00* (2006.01)
*G02B 6/42* (2006.01)

(52) U.S. Cl.
CPC ........... *G02B 6/002* (2013.01); *G02B 6/0051* (2013.01); *G02B 6/0083* (2013.01)

(58) Field of Classification Search
CPC ............ G02F 1/133615; G02B 6/0051; G02B 6/0083; G02B 6/002; G02B 6/0053
(Continued)

(56) References Cited

U.S. PATENT DOCUMENTS 6,181,981 B1 * 1/2001 Varga .................. G06Q 10/087
700/236
2005/0002205 A1 1/2005 Yu et al.
(Continued)

FOREIGN PATENT DOCUMENTS

CN 201242066 Y 5/2009
CN 201666517 U 12/2010
(Continued)

OTHER PUBLICATIONS

International Search Report and Written Opinion dated Dec. 1, 2015 regarding PCT/CN2015/086254. Translation provided by Dragon Intellectual Property Law Firm.

*Primary Examiner* — Karabi Guharay
(74) *Attorney, Agent, or Firm* — Harness, Dickey & Pierce, P.L.C.

(57) ABSTRACT

The present disclosure provides a backlight source, including: a light-guide plate, a diffuser arranged at a light-exiting side of the light-guide plate, and a light bar arranged at a light-entering side of the light-guide plate and including a light-emitting diode (LED) lamp and a flexible circuit board connected to the LED lamp. The flexible circuit board includes a base material, and a first solder mask and a second solder mask arranged at two surfaces of the base material opposite to each other. The base material includes a first region where the second solder mask is arranged and a second region where the second solder mask is not arranged. The second region is located at a side of the base material adjacent to the light-guide plate. The diffuser includes, at an (Continued)

end adjacent to the light bar, a connection member partially or completely covering the second region.

15 Claims, 1 Drawing Sheet

(58) Field of Classification Search
USPC .......................................................... 349/64
See application file for complete search history.

(56) References Cited

U.S. PATENT DOCUMENTS

| | | | | |
|---|---|---|---|---|
| 2005/0285973 | A1* | 12/2005 | Singh | ................ H01L 27/14618 |
| | | | | 348/374 |
| 2011/0141397 | A1* | 6/2011 | Lee | ...................... G02B 6/0083 |
| | | | | 349/64 |
| 2014/0183746 | A1* | 7/2014 | Lin | ....................... H01L 23/562 |
| | | | | 257/772 |

FOREIGN PATENT DOCUMENTS

| | | |
|---|---|---|
| CN | 102102831 A | 6/2011 |
| CN | 201875648 U | 6/2011 |
| CN | 202361184 U | 8/2012 |
| CN | 204466035 U | 7/2015 |

* cited by examiner

BACKLIGHT SOURCE AND DISPLAY DEVICE

CROSS-REFERENCE TO RELATED APPLICATION APPLICATIONS

This application is the U.S. national phase of PCT Application No. PCT/CN2015/086254 filed on Aug. 6, 2015, which claims a priority of the Chinese Patent Application No. 201520175601.6 filed on Mar. 26, 2015, the disclosures of which are incorporated in their entirety by reference herein.

TECHNICAL FIELD

The present disclosure relates to the field of display technology, in particular to a backlight source and a display device.

BACKGROUND

For an existing backlight source, a diffuser includes a first region covering a flexible printed circuit (FPC) board. Usually, there is a gap between the first region and a light-guide plate, and when the FPC is pressed, a display effect will be adversely affected.

SUMMARY

An object of the present disclosure is to provide a backlight source and a display device, so as to reduce the gap between the diffuser and the light-guide plate, thereby to prevent the occurrence of light leakage.

In one aspect, the present disclosure provides in some embodiments a backlight source, including a light-guide plate, a diffuser arranged at a light-exiting side of the light-guide plate, and a light bar arranged at a light-entering side of the light-guide plate and including a light-emitting diode (LED) lamp and a flexible circuit board connected to the LED lamp. The flexible circuit board includes a base material, and a first solder mask and a second solder mask arranged at two surfaces of the base material opposite to each other. The first solder mask is arranged at a surface of the base material adjacent to the light-guide plate, the second solder mask is arranged at a surface of the base material away from the light-guide plate, and the first solder mask is connected to the LED lamp. The base material includes, at the surface where the second solder mask is arranged, a first region where the second solder mask is arranged and a second region where the second solder mask is not arranged, and the second region is located at a side of the base material adjacent to the light-guide plate. The diffuser includes, at an end adjacent to the light bar, a connection member partially or completely covering the second region.

Further, a copper wire layer is arranged on the second solder mask and electrically connected to the LED lamp, and an area of a wiring region where the copper wire layer is arranged is not greater than an area of the second solder mask.

Further, the light-guide plate includes a flared structure at an end adjacent to the light bar, and one end of the first solder mask adjacent to the light-guide plate is arranged above the flared structure of the light-guide plate.

Further, the flared structure has an oblique surface at the light-exiting side of the light-guide plate, and the first solder mask is arranged close to the oblique surface.

Further, the flared structure has a flat surface at a side opposite to the light-exiting side of the light-guide plate.

Further, the second solder mask is of a thickness identical to the diffuser.

Further, the diffuser is of a thickness of 0.04 to 0.055 mm.

Further, a silkscreen character is arranged on the first solder mask.

In another aspect, the present disclosure provides in some embodiments a display device including the above-mentioned backlight source.

According to the embodiments of the present disclosure, the second solder mask does not completely cover the base material of the flexible circuit board, and the diffuser is directly lapped onto the base material. As a result, it is able to reduce a gap between the diffuser and the light-guide plate, thereby to prevent the occurrence of light leakage.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
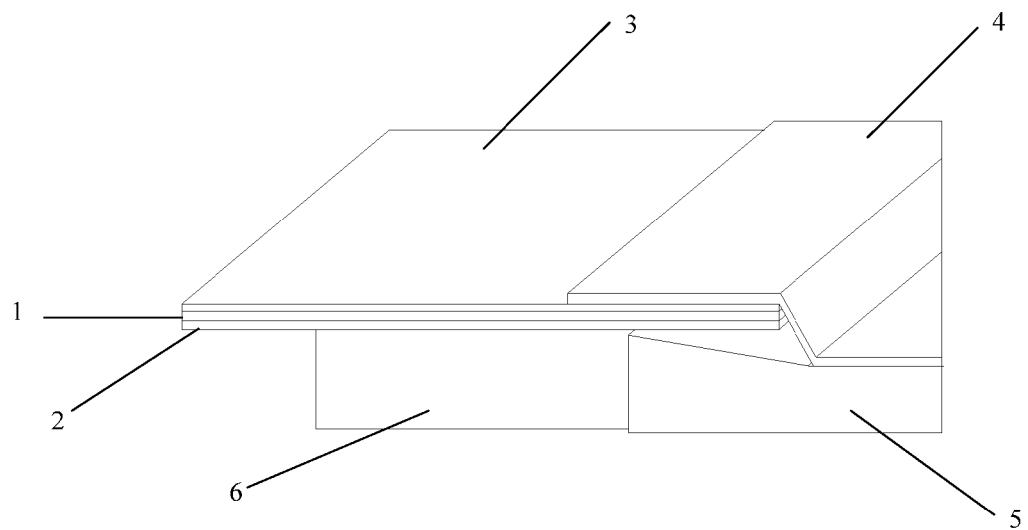
FIG. 1 is a schematic view showing an existing backlight source.

As shown in FIG. 1, for an existing backlight source, a diffuser includes a first region covering an FPC. The FPC includes a base material 1, and a first solder mask 2 and a second solder mask 3 which are arranged at two surfaces of the base material 1 opposite to each other. The first solder mask 2 is connected to an LED lamp 6, and the diffuser 4 is lapped onto the second solder mask 3. However, because a portion of the light-guide plate 5 corresponding to the first region of the diffuser 4 is of a flared shape, there is a gap between the first region of the diffuser 4 and the light-guide plate 5. When the FPC is pressed, a lamp-before effect of the backlight source will change along with a decrease in the gap.

Figure 2:
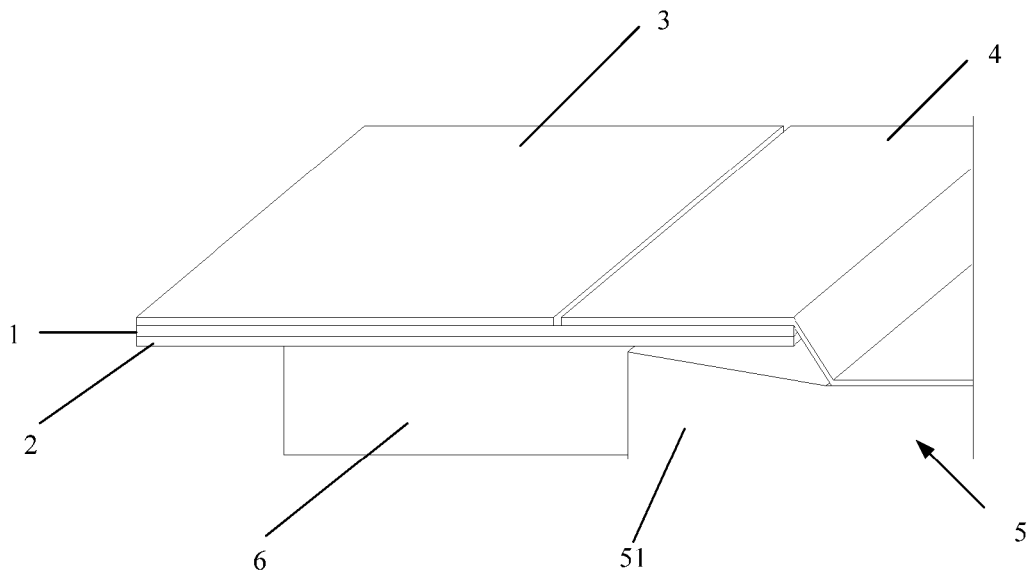
FIG. 2 is a schematic view showing a backlight source according to one embodiment of the present disclosure.

As shown in FIG. 2, the present disclosure provides in some embodiments a backlight source, which includes a light-guide plate 5, a diffuser 4 arranged at a light-exiting side of the light-guide plate 5, and a light bar arranged at a light-entering side of the light-guide plate 5 and including a light-emitting diode (LED) lamp 6 and a flexible circuit board connected to the LED lamp 6. The flexible circuit board includes a base material 1, and a first solder mask 2 and a second solder mask 3 arranged at two surfaces of the base material 1 opposite to each other. The first solder mask 2 is arranged at a surface of the base material 1 adjacent to the light-guide plate 5, the second solder mask 3 is arranged at a surface of the base material 1 away from the light-guide plate 5, and the first solder mask 2 is connected to the LED lamp 6.

The base material 1 includes, at the surface where the second solder mask 3 is arranged, a first region where the second solder mask 3 is arranged and a second region where the second solder mask 3 is not arranged, and the second region is located at a side of the base material adjacent to the light-guide plate 5. The diffuser 4 includes, at an end adjacent to the light bar, a connection member partially or completely covering the second region.

The base material 1 of the flexible circuit board includes the first region where the second solder mask 3 is located and a second region where the second solder mask 3 is not located, i.e., the second solder mask 3 does not completely cover the base material 1. As shown in FIG. 2, the second region is arranged at a side of the first region. As compared with the related art, a length of the second solder mask 3 in a direction from left to right (a direction as shown in FIG. 2) may be reduced in the embodiments of the present disclosure. The connection member of the diffuser 4 partially or completely covers the second region, i.e., the diffuser 4 is directly lapped onto the base material 1. As a result, it is able to reduce the gap between the connection member of the diffuser 4 and the light-guide plate 5 and prevent the lamp-before effect from being changed when the flexible circuit board is pressed, thereby to prevent the occurrence of light leakage due to the gap between the connection member of the diffuser 4 and the light-guide plate 5.

Alternatively, a copper wire layer (not shown) is arranged on the second solder mask 3 and electrically connected to the LED lamp 6, and an area of a wiring region where the copper wire layer is arranged is not greater than an area of the second solder mask 3, so as to prevent the wiring of the copper wire electrically connected to the LED lamp 6 from being adversely affected due to a decrease in the area of the second solder mask 3.

Alternatively, the light-guide plate 5 includes a flared structure 51 at an end adjacent to the light bar, and one end of the first solder mask 2 adjacent to the light-guide plate 5 is arranged above the flared structure 51 of the light-guide plate 5.

As shown in FIG. 2, the flared structure 51 is a portion of the light-guide plate 5 below the connection member of the diffuser 4. One end of the flared structure 51 adjacent to the LED lamp 6 has a thickness greater than another end of the flared structure 51 away from the LED lamp 6. The flared structure 51 is open-mouthed and looks like a horn.

The flared structure has an oblique surface at the light-exiting side of the light-guide plate 5, and the flared structure 51 may has a flat or oblique surface at a side opposite to the light-exiting side of the light-guide plate 5.

To be specific, in an alternative embodiment, as shown in FIG. 2, the flared structure 51 has an oblique surface at the light-exiting side of the light-guide plate 5, and the first solder mask 2 is arranged close to the oblique surface. In this way, it is able to allow all light beams from the LED lamp 6 to enter the light-guide plate, thereby to improve the light utilization rate.

In another alternative embodiment, the flared structure 51 has a flat surface at a side opposite to the light-exiting side of the light-guide plate 5, so as to reduce a thickness of the entire backlight source and reduce the manufacture difficulty.

A portion of the flexible circuit board located above the light-guide plate 5 is reduced, so as to enable the flexible circuit board to be more flexible, thereby to attach the flexible circuit board to the flared structure of the light-guide plate in a tighter manner.

Alternatively, the second solder mask 3 is of a thickness identical to the diffuser 4.

Alternatively, the diffuser 4 is of a thickness of 0.04 to 0.055 mm.

Alternatively, a silkscreen character (not shown) is arranged as an identifier on the first solder mask 2.

The present disclosure further provides in some embodiments a display device including the above-mentioned backlight source.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A backlight source, comprising:
    a light-guide plate;
    a diffuser arranged at a light-exiting side of the light-guide plate; and
    a light bar arranged at a light-entering side of the light-guide plate,
    wherein the light bar comprises a light-emitting diode (LED) lamp and a flexible circuit board connected to the LED lamp,
    the flexible circuit board comprises a base material, a first solder mask and a second solder mask, the first solder mask and the second solder mask are arranged at two surfaces of the base material opposite to each other respectively,
    the first solder mask is arranged at a surface of the base material adjacent to the light-guide plate, the second solder mask is arranged at a surface of the base material away from the light-guide plate, and the first solder mask is connected to the LED lamp,
    the base material comprises, at the surface where the second solder mask is arranged, a first region where the second solder mask is arranged and a second region where the second solder mask is not arranged, and the second region is located at a side of the base material adjacent to the light-guide plate,
    the diffuser comprises, at an end adjacent to the light bar, a connection member partially or completely covering the second region,
    the light-guide plate comprises a flared structure at an end adjacent to the light bar,
    the flared structure has an oblique surface at the light-exiting side of the light-guide plate, and
    the flexible circuit board and the first solder mask extend to overlap the oblique surface of the light-guide plate.

2. The backlight source according to claim 1, wherein a copper wire layer is arranged on the second solder mask and electrically connected to the LED lamp, and an area of a wiring region where the copper wire layer is arranged is not greater than an area of the second solder mask.

3. The backlight source according to claim 1, wherein the flared structure has a flat surface at a side opposite to the light-exiting side of the light-guide plate.

4. The backlight source according to claim 1, wherein the second solder mask is of a thickness identical to the diffuser.

5. The backlight source according to claim 4, wherein the diffuser is of a thickness of 0.04 to 0.055 mm.

6. The backlight source according to claim 1, wherein the diffuser is of a thickness of 0.04 to 0.055 mm.

7. The backlight source according to claim 1, wherein a silkscreen character is arranged on the first solder mask.

8. A display device, comprising the backlight source according to claim 1.

9. The display device according to claim 8, wherein a copper wire layer is arranged on the second solder mask and electrically connected to the LED lamp, and an area of a wiring region where the copper wire layer is arranged is not greater than an area of the second solder mask.

10. The display device according to claim 8, wherein the flared structure has a flat surface at a side opposite to the light-exiting side of the light-guide plate.

11. The display device according to claim 8, wherein the second solder mask is of a thickness identical to the diffuser.

12. The display device according to claim 11, wherein the diffuser is of a thickness of 0.04 to 0.055 mm.

13. The display device according to claim 8, wherein the diffuser is of a thickness of 0.04 to 0.055 mm.

14. The display device according to claim 8, wherein a silkscreen character is arranged on the first solder mask.

15. The display device according to claim 8, wherein the flared structure has a flat surface at a side opposite to the light-exiting side of the light-guide plate.

* * * * *